(12) United States Patent
Bacher et al.

(10) Patent No.: US 7,368,515 B2
(45) Date of Patent: May 6, 2008

(54) POLYVINYL ALCOHOLS AND POLYVINYL ACETALS CONTAINING SILANE

(75) Inventors: Andreas Bacher, Burghausen (DE);
Kurt Stark, Burgkirchen (DE);
Thomas Kornek, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 381 days.

(21) Appl. No.: 10/522,125

(22) PCT Filed: Jul. 17, 2003

(86) PCT No.: PCT/EP03/07789

§ 371 (c)(1),
(2), (4) Date: Jan. 24, 2005

(87) PCT Pub. No.: WO2004/013190

PCT Pub. Date: Feb. 12, 2004

(65) Prior Publication Data

US 2006/0052530 A1 Mar. 9, 2006

(30) Foreign Application Priority Data

Jul. 25, 2002 (DE) ................. 102 33 934

(51) Int. Cl.
*C08F 8/12* (2006.01)
*C08F 8/28* (2006.01)
(52) U.S. Cl. .............. 526/279; 526/315; 526/330
(58) Field of Classification Search ........... 526/279, 526/315, 330
See application file for complete search history.

(56) References Cited

U.S. PATENT DOCUMENTS

| 3,160,614 A | | 12/1964 | Walter et al. | |
| 4,097,436 A | * | 6/1978 | Buning et al. | ............ 524/503 |
| 4,476,172 A | | 10/1984 | Ward | |
| 4,544,724 A | | 10/1985 | Sogah et al. | |
| 4,739,021 A | * | 4/1988 | Harris, Jr. | ............. 526/90 |
| 5,036,137 A | | 7/1991 | Sau | |
| 5,753,733 A | | 5/1998 | Eck et al. | |
| 6,221,994 B1 | | 4/2001 | Galbiati et al. | |
| 6,337,370 B1 | | 1/2002 | Bae et al. | |
| 6,346,570 B1 | | 2/2002 | Kazuyuki et al. | |
| 2003/0045633 A1 | | 3/2003 | Stark et al. | |

FOREIGN PATENT DOCUMENTS

| CA | 2319786 A1 | | 8/1999 |
| DE | 24 12 292 | | 9/1975 |
| DE | 28 30 324 | | 2/1979 |
| DE | 44 02 408 A1 | | 8/1995 |
| DE | 198 07 504 A1 | | 8/1999 |
| DE | 101 40 129 A1 | | 3/2003 |
| EP | 0 123 927 A2 | | 11/1984 |
| EP | 123927 A | * | 11/1984 |
| EP | 0 322 175 | | 6/1989 |
| EP | 322175 A | * | 6/1989 |
| EP | 0 581 576 A1 | | 2/1994 |
| EP | 0 656 370 A1 | | 6/1995 |
| FR | 71.30711 | | 4/1972 |
| GB | 1306918 | | 2/1973 |
| JP | 62-181305 | | 8/1987 |
| JP | 5-297594 | | 11/1993 |
| JP | 6-247760 | | 9/1994 |
| JP | 6-248247 | | 9/1994 |
| JP | 10-237259 | | 9/1998 |
| WO | WO 01/09249 A1 | | 2/2001 |

OTHER PUBLICATIONS

Murahashi et al., "Synthesis of Alternating Copolymers of the Vinyl Alcohol," J. Polymer Sci. B.; Polymer Letters 54 (1996), No. 3, p. 187.
Tezuka et al., "Synthesis of a Polyvinyl Alcohol Polydimethylsiloxane Group Polymers," Makromol. Chem. 186 (1985), No. 4, p. 193.

* cited by examiner

*Primary Examiner*—Kelechi C. Egwim
(74) *Attorney, Agent, or Firm*—Brooks Kushman P.C.

(57) ABSTRACT

The invention relates to polyvinyl alcohols and polyvinyl acetals which contain silane and can be obtained by means of a) radical polymerization of at least one vinyl ester of unbranched or branched alkyl carboxylic acids comprising between 1 and 18 C atoms, in the presence of aldehydes containing silane or the hemiacetals or full acetals thereof, b) saponification of the vinyl ester polymers obtained thereby, and optionally c) acetalation of the partially saponified or fully saponified vinyl ester polymers.

8 Claims, No Drawings

POLYVINYL ALCOHOLS AND POLYVINYL ACETALS CONTAINING SILANE

BACKGROUND OF THE INVENTION

1. Field of the Invention

The invention relates to silane-containing polyvinyl alcohols and polyvinyl acetals, to processes for their preparation and to their use.

2. Description of the Related Art

The prior art discloses a series of processes for preparing silane-containing polymers. The preparation may be effected, for example, by means of polymer-like reaction of functional polymers with silylating agents. U.S. Pat. No. 5,036,137, for example, describes the preparation of silylated polyvinyl alcohol by reacting polyvinyl alcohol with 3-glycidoxypropyltrimethoxysilane or vinyltrimethoxysilane. EP-A 581576 discloses the reaction of OH-functional polymers such as polyvinyl alcohol with alkylorthosilicates or alkyltrialkoxysilanes.

Silane-containing polymers may also be prepared by means of copolymerization of silane-functional, ethylenically unsaturated monomers. EP-A 123927 relates to silyl-modified polyvinyl alcohols which are obtainable, among other routes, by copolymerization of vinyl esters with silyl-functional comonomers and subsequent hydrolysis.

A further route is the introduction of silane groups into the polymer by terminating the polymer chain with thio compounds containing Si groups, for example mercaptosilanes, as described in U.S. Pat. No. 6,346,570; or termination by means of Michael addition of functional silanes, as disclosed by U.S. Pat. No. 6,221,994. WO-A 01/09249 discloses the preparation of silane-functional copolymers by means of copolymerization with vinyl-silane and termination of the polymer chain with mercaptosilane. A disadvantage in the termination of polymer chains with mercaptosilanes is their toxicity and their tendency to add to double bonds. Furthermore, these mercaptosilanes have an excessively strong tendency to control the molecular weight, which is manifested in too great a reduction in the molecular weight. In addition, the reaction rate in the polymerization is frequently reduced. Further disadvantages in the use of mercaptosilanes are their tendency to yellowing and their unpleasant odor.

Silane-modified polyvinyl acetals are disclosed by four Japanese publications. JP-A 06-247760 and JP-A 06-248247 disclose polyvinyl acetals modified with silane-functional monomer units, which are used as binder for cement compositions or for inorganic fiber materials. These Si-modified polyvinyl acetals are obtained by copolymerizing vinyl acetate with vinylalkoxysilanes, subsequently hydrolyzing the vinyl ester-vinylsilane copolymers and finally acetalizing with aldehyde. JP-A 10-237259 relates to a mixture of silane-modified polyvinyl acetal with unmodified polyvinyl acetal for coating materials for printing with inkjet printers, for which vinyl ester-vinylsilane copolymers are initially hydrolyzed and subsequently mixed with unmodified polyvinyl alcohol in order to be acetalized with aldehyde. JP-A 62-181305 finally discloses a polyvinyl butyral modified with triethoxyisocyanato-propylsilane. In this case, the alkoxysilane group is linked to the polymer structure by polymer-like reaction via a urethane bond (by reaction of the isocyanate group of the silane with free hydroxyl groups on the polyvinyl butyral).

DE-A 10140129 discloses the acetalization of partly hydrolyzed or fully hydrolyzed vinyl ester polymers with silane-containing aldehydes.

SUMMARY OF THE INVENTION

The invention provides silane-containing polyvinyl alcohols and polyvinyl acetals, obtainable by means of a) free-radical polymerization of one or more vinyl esters of unbranched or branched alkylcarboxylic acids having from 1 to 18 carbon atoms in the presence of silane-containing aldehydes or hemiacetals or full acetals thereof, b) hydrolysis of the thus obtained vinyl ester polymers, and optionally c) acetalization of the partly hydrolyzed or fully hydrolyzed vinyl ester polymers.

DETAILED DESCRIPTION OF THE PREFERRED EMBODIMENTS

Suitable vinyl esters are vinyl esters of unbranched or branched carboxylic acids having from 1 to 18 carbon atoms. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 5 to 13 carbon atoms, for example VeoVa9$^R$ or VeoVa10$^R$ (trade names of Shell). Particular preference is given to vinyl acetate In addition to the vinyl ester units, one or more monomers from the group consisting of methacrylic esters and acrylic esters of alcohols having from 1 to 15 carbon atoms, olefins, dienes, styrenics and vinyl halides may optionally also be copolymerized. Suitable monomers from the group of the esters of acrylic acid or methacrylic acid are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-, iso- and t-butyl acrylate, n-, iso- and t-butyl methacrylate, 2-ethylhexyl acrylate, norbornyl acrylate. Particular preference is given to methyl acrylate, methyl methacrylate, n-, iso- and t-butyl acrylate, 2-ethylhexyl acrylate, norbornyl acrylate. Suitable dienes are 1,3-butadiene and isoprene. Examples of polymerizable olefins are ethene and propene. Styrenics which may be copolymerized are styrene and vinyltoluene. From the group of the vinyl halides, typically vinyl chloride, vinylidene chloride or vinyl fluoride, preferably vinyl chloride, are used. The proportion of these comonomers is such that the proportion of vinyl ester monomer is ≧50 mol % in the vinyl ester polymer.

Still further comonomers may optionally be present in a proportion of preferably from 0.02 to 20% by weight, based on the total weight of the vinyl ester polymer. Examples thereof are ethylenically unsaturated mono- and dicarboxylic acids, preferably acrylic acid, methacrylic acid, fumaric acid and maleic acid; ethylenically unsaturated carboxamides and carbonitriles, preferably N-vinylformamide, acrylamide and acrylonitrile; mono- and diesters of fumaric acid and maleic acid such as the diethyl and diisopropyl esters, and also maleic anhydride, ethylenically unsaturated sulfonic acids or salts thereof, preferably vinylsulfonic acid, 2-acrylamido-2-methylpropanesulfonic acid. Further examples are precrosslinked comonomers such as ethylenically polyunsaturated comonomers, for example divinyl adipate, diallyl maleate, allyl methacrylate, butanediol diacrylate or triallyl cyanurate, or postcrosslinked comonomers, for example acrylamidoglycolic acid (AGA), methyl methylacrylamidoglycolate (MAGME), N-methylolacrylamide (NMA), N-methylolmethacrylamide, N-methylolallyl carbamate, alkyl ethers and esters such as the isobutoxy ether or ester of N-methylolacrylamide, of N-methylolmethacrylamide and of N-methylolallyl carbamate.

Suitable silane-containing aldehydes or hemiacetals or full acetals thereof can be specified by the following structural formulae I to VI:

I) $R_3Si-[OSiR_2]_y-(CH_2)_x-CH=O$ (aldehyde),
II) $R_3Si-[OSiR_2]_y-(CH_2)_x-CH(OR^1)_2$ (hemiacetal/full acetal),
III) $R_3Si-[OSiR_2]_y-(CH_2)_z-Ar-(CH_2)_z-CH=O$ (aldehyde),
IV) $R_3Si-[OSiR_2]_y-(CH_2)_z-Ar-(CH_2)_z-CH(OR^1)_2$ (hemiacetal/full acetal),
V) $O=CH-(CH_2)_x-Si(R)_2-O-Si(R)_2-(CH_2)_x-CH=O$ (aldehyde dimers),
VI) $[SiO(R)-(CH_2)_z-CH=O]_{3-4}$ (cyclic tri- and tetramers), where R is the same or different and is halogen, preferably Cl or Br; is an unbranched or branched, saturated or unsaturated, optionally substituted alkyl or alkoxy radical having from 1 to 12 carbon atoms, preferably having from 1 to 3 carbon atoms; is an acyl radical having from 2 to 12 carbon atoms, where R may optionally be interrupted by heteroatoms from the group consisting of N, O, S; is an optionally substituted aryl or aryloxy radical having 3 to 20 carbon atoms, where the aromatic may also contain one or more heteroatoms from the group consisting of N, O, S. One R radical may preferably be hydrolyzed in order to form a free silanol group Si—OH.

$R^1$ is an unbranched or branched, saturated or unsaturated, optionally substituted alkyl radical having from 1 to 12 carbon atoms, preferably from 1 to 3 carbon atoms, which may optionally be interrupted by heteroatoms from the group consisting of N, O, S. However, $R^1$ may also be H, in which case a hemiacetal is present when one $R^1$ radical is H, or an aldehyde hydrate when both $R^1$ radicals are H. Ar is an aromatic group, preferably phenylene, and this also includes aromatics which contain one or more heteroatoms from the group consisting of N, O, S. These aromatics may also have different substitution.

x is a number from 2 to 40, preferably from 2 to 10. y is a number from 0 to 100, preferably a number from 0 to 10. z is a number between 0 and 20, preferably from 0 to 5.

The silane-containing aldehydes are used in an amount of from 0.0001 to 5.0% by weight, preferably from 0.01 to 4.0% by weight, more preferably from 0.1 to 3.0% by weight, based in each case on the total weight of the monomers.

Preferred silane-containing aldehydes or the hemi-acetals or full acetals thereof are those of the structural formulae I and II, especially those aldehyde derivatives which can be obtained by hydrosilylation of acrolein or the hemiacetal or full acetal thereof, for example 3,3-diethoxypropyltriethoxysilane, 3,3-dimethoxypropyltriethoxysilane, 3,3-diethoxypropyltrimethoxysilane, 3,3-dimethoxypropyltrimethoxysilane, 3,3-diethoxypropylmethyldiethoxysilane, 3,3-dimethoxypropyldiisopropoxymethylsilane, 3,3-diethoxypropyldimethylethoxysilane, 3,3-dimethoxypropyldiisopropoxymethylsilane, 3,3-dimethoxypropyltripropoxysilane, 3,3-dimethoxypropyltriisopropoxysilane, 3,3-dipropoxypropyltriethoxysilane, 3,3-diethoxypropyldimethylmethoxysilane, 3,3-diethoxypropyldimethylmethoxysilane, 3,3-dimethoxypropylmethyldimethoxysilane, 3,3-dimethoxypropyldimethylmethoxysilane, 3,3-dimethoxypropylmethyldiethoxysilane, 3-(trimethoxysilyl)propionaldehyde, 3-(triethoxysilyl)propionaldehyde, 3-trimethylsilylpropionaldehyde, 3-(methyldiethoxy)silylpropionaldehyde. Preference is also given to 4-(trimethoxysilyl)butyraldehyde and 1,1'-diethylformyltetramethyldisiloxane (dimer according to V). The free aldehyde groups are released by hydrolysis in an aqueous medium in the case of the hemiacetals and full acetals.

To increase the degree of silanization, ethylenically unsaturated, silane-containing monomers may additionally also be copolymerized. Suitable ethylenically unsaturated, silane-containing monomers are, for example, ethylenically unsaturated silicon compounds of the general formula $R^2SiR^3_{0-2}(OR^4)_{1-3}$ where $R^2$ is defined as $CH_2=CR^5-(CH_2)_{0-1}$ or $CH_2=CR^5CO_2(CH_2)_{1-3}$, $R^3$ is defined as $C_1$- to $C_3$-alkyl radical, $C_1$- to $C_3$-alkoxy radical or halogen, preferably Cl or Br, $R^4$ is an unbranched or branched, optionally substituted alkyl radical having from 1 to 12 carbon atoms, preferably from 1 to 3 carbon atoms, or is an acyl radical having from 2 to 12 carbon atoms, where $R^4$ may optionally be interrupted by an ether group, and $R^5$ is H or $CH_3$. The ethylenically unsaturated, silane-containing monomers are preferably copolymerized in an amount of from 0.01 to 10.0% by weight, more preferably from 0.01 to 1.0% by weight, based in each case on the total weight of the comonomers.

Preferred ethylenically unsaturated, silane-containing monomers are γ-acryloyl- or γ-methacryloyloxypropyltri (alkoxy)silanes, α-methacryloyloxymethyltri(alkoxy)silanes, γ-methacryloyloxypropylmethyldi(alkoxy)silanes; vinylsilanes such as vinylalkyldi(alkoxy)silanes and vinyltri(alkoxy)silanes, in which the alkoxy groups used may be, for example, methoxy, ethoxy, methoxyethylene, ethoxyethylene, methoxypropylene glycol ether or ethoxypropylene glycol ether radicals. Examples of preferred silane-containing monomers are 3-methacryloyloxypropyltrimethoxysilane, 3-methacryloyloxypropylmethyldimethoxysilane, vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allyltriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexoxysilane, vinyltrioctyloxysilane, vinyldimethoxyoctyloxysilane, vinylmethoxydioctyloxysilane, vinylmethoxydilauryloxysilane, vinyldimethoxylauryloxysilane and also polyethylene glycol-modified vinylsilanes.

The most preferred silanes are vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane and methacryloyloxymethyltrimethoxysilane and mixtures thereof.

Suitable ethylenically unsaturated, silane-containing monomers are also (meth)acrylamides containing silane groups which are of the general formula $CH_2=CR^6-CO-NR^7-R^8-SiR^9_n-(R^{10})_{3-m}$ where n= from 0 to 4, m= from 0 to 2, $R^6$ is either H or a methyl group, $R^7$ is H or an alkyl group having from 1 to 5 carbon atoms; $R^8$ is an alkylene group having from 1 to 5 carbon atoms or a bivalent organic group in which the carbon chain is interrupted by an oxygen or nitrogen atom, $R^9$ is an alkyl group having from 1 to 5 carbon atoms, $R^{10}$ is an alkoxy group having from 1 to 40 carbon atoms which may be substituted by further heterocycles. In monomers in which 2 or more $R^6$ or $R^{10}$ groups occur, they may be identical or different. The (meth)acrylamidoalkylsilanes are also preferably copolymerized in an amount of from 0.01 to 10.0% by weight, more preferably from 0.01 to 1.0% by weight, based in each case on the total weight of the comonomers.

Examples of such (meth)acrylamidoalkylsilanes are: 3-(meth)acrylamidopropyltrimethoxysilane, 3-(meth)acrylamidopropyltriethoxysilane, 3-(meth)acrylamidopropyltri(β-methoxyethoxy)silane, 2-(meth)acrylamido-2-methylpropyltrimethoxysilane, 2-(meth)acrylamido-2-methylethyltrimethoxysilane, N-(2-(meth)acrylamidoethyl)aminopropyltrimethoxysilane, 3-(meth)acrylamidopropyltriacetoxysilane, 2-(meth)acrylamidoethyltrimethoxysilane, 1-(meth)acrylamidomethyltrimethoxysilane, 3-(meth)acrylamidopropylmethyldimethoxysilane, 3-(meth)acrylamidopropyldimethylmethoxysilane, 3-(N-methyl(meth)acrylamido)propyltrimethoxysilane, 3-((meth)acrylamidomethoxy)-3-hydroxypropyltrimethoxysilane, 3-((meth)acrylamidomethoxy)propyltrimethoxysilane, N,N-dimethyl-N-trimethoxysilylpropyl-3-(meth)-acrylamidopropylammonium chloride and N,N-dimethyl-N-trimethoxysilylpropyl-2-(meth)acrylamido-2-methylpropylammonium chloride.

The vinyl ester polymers may be prepared in a known manner by means of polymerization; preferably by bulk polymerization, suspension polymerization or by polymerization in organic solvents, more preferably in alcoholic solution. Suitable solvents and regulators are, for example, methanol, ethanol, propanol, and isopropanol. The polymerization is carried out under reflux at a temperature of from 50° C. to 100° C. and the free-radical reaction is initiated by adding common initiators. Examples of common initiators are percarbonates such as cyclohexyl peroxodicarbonate or peresters such as t-butyl perneodecanoate or t-butyl perpivalate.

The adjustment of the molecular weight may be effected in a known manner by the solvent content, by variation of the initiator concentration, by variation of the temperature, but in particular by addition and variation of the amount of the silane-containing aldehyde. The monomers may be initially charged in their entirety, be metered in their entirety or be initially charged in portions and the remainder added after the initiation of the polymerization. The meterings may be carried out separately (spatially and temporally) or some or all of the components to be metered may be metered in preemulsified form. The silane-containing aldehydes or the hemiacetals or full acetals thereof which are used as regulators may be initially charged in their entirety, metered in their entirety or be initially charged in portions and the remainder metered in. Preference is given to initially charging a portion and metering in the remainder. Particular preference is given to adding regulators and monomers in such a way their molar ratio remains the same. This measure provides a homogeneous molecular weight distribution.

In addition to the silane-containing aldehydes used as regulators, it is also additionally possible to use further regulators based on silane-containing compounds or on aldehydes.

The hydrolysis of the silanized vinyl ester polymers to silane-containing polyvinyl alcohols is effected in a manner known per se, for example by the belt or kneader process, in an alkaline or acidic medium with the addition of acid or base. Preference is given to taking up the silanized polyvinyl ester solid resin in alcohol, for example methanol, while setting a solids content of from 15 to 70% by weight. Preference is given to carrying out the hydrolysis in a basic medium, for example by adding NaOH, KOH or NaOCH$_3$. The base is generally used in an amount of from 1 to 5 mol % per mole of ester units. The hydrolysis is carried out at temperatures of from 30° C. to 70° C. On completion of the hydrolysis, the solvent is distilled off and the polyvinyl alcohol is obtained as a powder. However, the silane-containing polyvinyl alcohol may also be obtained as an aqueous solution by a gradual addition of water while the solvent is distilled off.

The partly or fully hydrolyzed, silanized vinyl ester polymers preferably have a degree of hydrolysis of from 50 mol % to 99.99 mol %, more preferably of from 70 mol % to 99 mol %, most preferably of $\geq 96$ mol %. Fully hydrolyzed refers to those polymers whose degree of hydrolysis is $\geq 96$ mol %. Partly hydrolyzed polyvinyl alcohols refer to those having a degree of hydrolysis of $\geq 50$ mol % and <96 mol %. The viscosity of the polyvinyl alcohol (DIN 53015, Höppler method; 4% solution in water) is from 1 to 60 mPas, preferably from 1 to 6 mPas, and serves as a measure of the molecular weight and of the degree of polymerization of the partly or fully hydrolyzed, silanized polyvinyl alcohols.

For the acetalization, the partly or fully hydrolyzed silane-containing polyvinyl esters are preferably taken up in an aqueous medium. Typically, a solids content of the aqueous solution of from 5 to 30% by weight is set. The acetalization is effected in the presence of acidic catalysts such as hydrochloric acid, sulfuric acid, nitric acid or phosphoric acid. Preference is given to setting the pH of the solution to values of <1 by adding 20% hydrochloric acid. After the catalyst has been added, the temperature of the solution is adjusted to preferably from −10° C. to +60° C. The lower the molecular weight of the silane-modified polyvinyl alcohol used, the lower the precipitation temperature selected. The acetalization reaction is started by adding the aldehyde(s).

For the acetalization, the partly or fully hydrolyzed vinyl ester polymers are reacted with aliphatic or aromatic aldehydes having preferably from 1 to 15 carbon atoms which may optionally be substituted by one or more substituents from the group consisting of hydroxyl, carboxyl, sulfonate, ammonium, and aldehyde radicals. If appropriate, the aldehydes may also be used in masked form, for example as hemiacetals or full acetals, or with protecting groups. Preferred aldehydes from the group of the aliphatic aldehydes having from 1 to 15 carbon atoms are formaldehyde, acetaldehyde, propionaldehyde and most preferably butyraldehyde or a mixture of butyraldehyde and acetaldehyde. The aromatic aldehydes used may be, for example, benzaldehyde or derivatives thereof.

The amount of aldehyde added depends upon the desired degree of acetalization. Since the acetalization proceeds with virtually complete conversion, the amount added may be determined by simple stoichiometric calculation. On completion of the addition of the aldehyde, the acetalization is completed by heating the mixture to from 20° C. to 70° C. and stirring for several hours, preferably from 1 to 6 hours, and the pulverulent reaction product is isolated by filtration and a subsequent washing step. For the stabilization, it is also possible to use alkalis, for example NaOH or KOH. During the precipitation and the aftertreatment, it is possible to work with emulsifiers in order to stabilize the aqueous suspension of the silane-containing polyvinyl acetal.

Polyvinyl acetals having a high degree of acetalization (>40 mol %) precipitate out in the aqueous medium in the course of the acetalization. Polyvinyl acetals having a low degree of acetalization (≦20 mol %) which are significantly more water-soluble may be precipitated as a solid by adding them dropwise to precipitation solvents. Suitable precipitation solvents are alcohols, for example methanol or ethanol. However, polyvinyl acetals having a low degree of acetalization may also be obtained as a solid from the aqueous solution by spray-drying, in which case there may be a subsequent grinding step. The aqueous solution of the silane-containing polyvinyl acetal having a low degree of acetalization may also be used further as such for the appropriate applications after neutralization.

To stabilize the aqueous suspension of the silane-modified polyvinyl acetal, it is possible to use anionic, zwitterionic, cationic and nonionic emulsifiers, and also protective colloids. Preference is given to using zwitterionic or anionic emulsifiers, if appropriate also in mixtures. The nonionic emulsifiers used are preferably condensates of ethylene oxide or propylene oxide with linear or branched alcohols having from 8 to 18 carbon atoms, alkylphenols or linear or branched carboxylic acids of from 8 to 18 carbon atoms, and also block copolymers of ethylene oxide and propylene oxide. Suitable anionic emulsifiers are, for example, alkyl sulfates, alkylsulfonates, alkyl aryl sulfates, and also sulfates or phosphates of condensates of ethylene oxide with linear or branched alkyl alcohols and having from 2 to 25 EO units, alkylphenols, and mono- or diesters of sulfosuccinic acid. Suitable zwitterionic emulsifiers are, for example, alkyldimethylamine oxides, the alkyl chain having from 6 to 16 carbon atoms. The cationic emulsifiers used may be, for example, tetraalkylammonium halides such as $C_6$-$C_{16}$-alkyltrimethylammonium bromide. It is equally possible to use trialkylamines having one longer (≧5 carbon atoms) and two shorter hydrocarbon radicals (<5 carbon atoms), which are present in protonated form in the course of the acetalization which proceeds under highly acidic conditions and can act as an emulsifier. The amount of emulsifier is preferably from 0.01 to 20% by weight, based on the total weight of the silane-modified polyvinyl acetal in the mother liquor. Preference is given to an amount of from 0.01 to 2% by weight of emulsifier; particular preference is given to an amount of from 0.01 to 1% of emulsifier based on the silane-modified polyvinyl acetal.

The silane-modified polyvinyl acetals have a degree of acetalization of from 1 to 80 mol %, preferably from 1 to 20 mol % and from 45 to 80 mol %. The viscosity of the silane-modified polyvinyl acetals (DIN 53015; Höppler method, 10% solution in ethanol) is from at least 4 mPas to 1200 mPas, preferably from 4 to 160 mPas. The degree of polymerization is at least 130. The ethanolic solutions of the silane-modified polyvinyl acetal may be converted by selective crosslinking of free silanol groups (with crosslinking catalysts which are known to those skilled in the art) to a gel state (having a viscosity distinctly greater than 1200 mPas) which is more or less marked depending on the silane content.

The silane-containing polyvinyl alcohols or polyvinyl acetals are suitable for use in the fields of application typical for these polymer classes. The silane-containing polyvinyl acetals are suitable as a binder for printing inks, and in the form of their films for laminated safety glass and glass laminates, high-performance safety glass or glazing films. Water-soluble, silane-containing polyvinyl acetals are suitable as a protective colloid, for example for aqueous dispersions and in polymerization in an aqueous medium, and in the preparation of dispersion powders redispersible in water. The silane-containing polyvinyl acetals may also be used in water-based coatings, in powder coatings, as binders in corrosion protectants, as binders in the ceramics industry, as binders for ceramic powders and metal powders in powder injection molding and as binders for the interior coating of cans.

The silane-containing polyvinyl alcohols are suitable as protective colloids in polymerization, as binders for paper coating slips, and as binders for building materials, ceramics and wood.

The following examples serve to further illustrate the invention without restricting it in any way:

Preparation of the Silane-Containing Polyvinyl Ester Solid Resins:

EXAMPLE 1

A 2-liter stirred tank with reflux condenser, metering apparatus, thermostatable jacket and an anchor stirrer was initially charged with 427.27 g of methanol, 77.12 g of vinyl acetate (VAc), 647.84 mg (2.63 mmol) of 1,1'-di(ethylformyl)tetramethyldisiloxane and 347.76 mg of PPV (t-butyl perpivalate—75% in aliphatics; half-life=1 h at 74° C.). The tank was heated to 60° C. On attainment of gentle reflux, the metering of initiator started (4.99 g of PPV and 46.74 g of methanol). During the first hour, the initiator was metered at 6 ml/h. After 1 hour of incipient polymerization, the monomer metering (390.3 g of VAc and 3.28 g (13.32 mmol) of 1,1'-di(ethylformyl)tetramethyldisiloxane) was subsequently started over a period of 240 minutes (rate: 106 ml/h). At the same time, the initiator metering was increased to 12 ml/h. The initiator metering ran at this rate for 240 minutes and ended with the monomer metering. After the initiator metering, the reaction ran for another 120 minutes at the reaction temperature. After this postreaction time, the tank was heated for distillation, in the course of which fresh methanol which corresponded to the amount distilled off was added to the tank every 30 minutes for 6 h (demonomerization).

Solid Resin Analyses:

Solids content (SC): 48.27% (methanolic solution); pure solid resin: viscosity (Höppler, 10% in ethyl acetate) 2.33 mPas; acid number AN (methanol) 8.98 mg KOH/g; Mw (by GPC, eluent THF; polystyrene standards): 31,000 g/mol; Mn: 12,200 g/mol; polydispersity Mw/Mn:2.54; silicon content: 0.119% (alkaline digestion); Si content by 1H NMR: 0.126%.

EXAMPLE 2

As in Example 1, with the difference that instead of 1,1'-di(ethylformyl)tetramethyldisiloxane 2.075 g (15.95 mmol) of 3-trimethylsilylpropionaldehyde were used. Of this, 342.34 mg (2.63 mmol) were used in the initial charge; 1.733 g (13.32 mmol) were in the monomer metering.

Solid Resin Analyses:

Solids content (SC): 49.32% (methanolic solution); pure solid resin: viscosity (Höppler, 10% in ethyl acetate) 2.65 mPas; acid number AN (methanol) 5.31 mg KOH/g; Mw (by GPC, eluent THF; polystyrene standards): 38,000 g/mol; Mn: 14,000 g/mol; polydispersity Mw/Mn: 2.71; silicon content: 0.075% (alkaline digestion); Si content by 1H NMR: 0.084%.

EXAMPLE 3

As in Example 1, with the difference that instead of 1,1'-di(ethylformyl)tetramethyldisiloxane 3.033 g (15.95 mmol) of 3-(methyldiethoxy)silylpropionaldehyde were used. Of this, 500.0 mg (2.63 mmol) were used in the initial charge; 2.533 g (13.32 mmol) were in the monomer metering.

Solid Resin Analyses:

Solids content (SC): 48.92% (methanolic solution); pure solid resin: viscosity (Höppler, 10% in ethyl acetate) 2.61 mPas; acid number AN (methanol) 6.02 mg KOH/g; Mw (by GPC, eluent THF; polystyrene standards): 37,500 g/mol; Mn: 13,700 g/mol; polydispersity Mw/Mn: 2.74; silicon content: 0.082% (alkaline digestion); Si content by 1H NMR: 0.087%.

COMPARATIVE EXAMPLE 4

As in Example 1, with the difference that, instead of silane-containing aldehyde 1,1'-di(ethylformyl)tetramethyl-disiloxane, 3.127 g (15.94 mmol) of 3-mercaptopropyltri-methoxysilane (Wacker GF 70) were used. Of this, 515.5 mg (2.63 mmol) were used in the initial charge; 2.612 g (13.31 mmol) were in the monomer metering.

Solid Resin Analyses:

Solids content (SC): 49.72% (methanolic solution); pure solid resin: viscosity (Höppler, 10% in ethyl acetate) 2.11 mPas; acid number AN (methanol) 10.09 mg KOH/g; Mw (by GPC, eluent THF; polystyrene standards): 26,400 g/mol; Mn: 11,400 g/mol; polydispersity Mw/Mn: 2.32; silicon content: 0.081% (alkaline digestion); Evaluation: Here it was found that the polymerization is retarded by the presence of a mercapto-containing regulator. Conversion with respect to time in the polymerization was lower than in Examples 1, 2 and 3. In addition, slight yellowing of the solution in the course of the polymerization was observed when the mercapto silane was used.

EXAMPLE 5

A 2-liter stirred tank with reflux condenser, metering apparatus, thermostatable jacket and an anchor stirrer was initially charged with 426.87 g of methanol, 77.05 g of vinyl acetate (VAc), 459.51 mg (1.87 mol) of 1,1'-di(ethylformyl) tetramethyldisiloxane, 315.82 mg of vinyltriethoxysilane (97%) and 347.44 mg of PPV (t-butyl perpivalate—75% in aliphatics; half-life=1 h at 74° C.). The tank was heated to 60° C. On attainment of gentle reflux, the metering of initiator started (4.98 g of PPV and 46.70 g of methanol). During the first hour, the initiator was metered at 6 ml/h. After 1 hour of incipient polymerization, the monomer metering (389.93 g of VAc, 1.61 g of vinyltriethoxysilane and 2.345 g (9.53 mmol) of 1,1'-di(ethylformyl)tetrameth-yldisiloxane) was subsequently started over a period of 240 minutes (rate: 106 ml/h). At the same time, the initiator metering was increased to 12 ml/h. The initiator metering ran at this rate for 240 minutes and ended with the monomer metering. After the initiator metering, the reaction ran for another 120 minutes at the reaction temperature. After this postreaction time, the tank was heated for distillation, in the course of which fresh methanol which corresponded to the amount distilled off was added to the tank every 30 minutes for 6 h (demonomerization).

Solid Resin Analyses:

Solids content (SC): 50.70% (methanolic solution); pure solid resin: viscosity (Höppler, 10% in ethyl acetate) 2.48 mPas; acid number AN (methanol) 6.73 mg KOH/g; Mw (by GPC, eluent THF; polystyrene standards): 36,500 g/mol; Mn: 15,500 g/mol; polydispersity Mw/Mn: 2.35; silicon content: 0.153% (alkaline digestion); Si content by 1H NMR: 0.162%.

COMPARATIVE EXAMPLE 6

As in Example 5, with the difference that, instead of silane-containing aldehyde 1,1'-di(ethylformyl)tetramethyl-disiloxane, and 2.238 g (11.41 mmol) of 3-mercaptopropy-ltrimethoxysilane were used. Of this, 366.39 mg (1.87 mmol) were used in the initial charge; 1.872 g (9.54 mmol) were in the monomer metering.

Solid Resin Analyses:

Solids content (SC): 48.7% (methanolic solution); pure solid resin: viscosity (Höppler, 10% in ethyl acetate) 2.37 mPas; acid number AN (methanol) 10.09 mg KOH/g; Mw (by GPC, eluent THF; polystyrene standards): 32,700 g/mol; Mn: 13,500 g/mol; polydispersity Mw/Mn: 2.42; silicon content: 0.113% (alkaline digestion); Evaluation: Comparative Example 6 leads to a lower molecular weight than Example 5. The mercapto compound is a very strong regulator. The silane aldehyde exhibits milder regulator action, even though 2 free aldehyde groups in the compound are transferred.

EXAMPLE 7

A 2-liter stirred tank with reflux condenser, metering apparatus, thermostatable jacket and an anchor stirrer was initially charged with 424.61 g of methanol, 72.81 g of vinyl acetate (VAc), 766.44mg of VeoVa10, 3.10 g of isopropenyl acetate (IPAc, 99%), 766.44mg (3.11 mmol) of 1,1'-di (ethylformyl)tetramethyldisiloxane and 345.59 mg of PPV (t-butyl perpivalate—75% in aliphatics; half-life=1 h at 74° C.). The tank was heated to 60° C. On attainment of gentle reflux, the metering of initiator started (4.95 g of PPV and 46.45 g of methanol). During the first hour, the initiator was metered at 6 ml/h. After 1 hour of incipient polymerization, the monomer metering (368.47 g of VAc, 3.88 g of VeoVa10, 15.67 g of IPAc (99%) and 3.88 g (15.76 nimol) of 1,1'-di (ethylformyl)tetramethyldisiloxane) was subsequently started over a period of 240 minutes (rate: 106 ml/h). At the same time, the initiator metering was increased to 12 ml/h. The initiator metering ran at this rate for 240 minutes and ended with the monomer metering. After the initiator metering, the reaction ran for another 120 minutes at the reaction temperature. After this postreaction time, the tank was heated for distillation, in the course of which fresh methanol which corresponded to the amount distilled off was added to the tank every 30 minutes for 6 h (demonomerization).

Solid Resin Analyses:

Solids content (SC): 47.61% (methanolic solution); pure solid resin: viscosity (Höppler, 10% in ethyl acetate) 2.26 mPas; acid number AN (methanol) 3.93 mg KOH/g; Mw (by GPC, eluent THF; polystyrene standards): 28,000 g/mol; Mn: 11,500 g/mol; polydispersity Mw/Mn: 2.43; silicon content: 0.155% (alkaline digestion); Si content by 1H NMR: 0.172%.

COMPARATIVE EXAMPLE 8

As in Example 7, with the difference that, instead of silane-containing aldehyde 1,1'-di(ethylformyl)tetramethyldisiloxane, 3.703 g (18.87 mmol) of 3-mercaptopropyltrimethoxysilane were used. Of this, 611.59 mg (3.12 mmol) were used in the initial charge; 3.091 g (15.75 mmol) were in the monomer metering.

Solid Resin Analyses:

Solids content (SC): 44.58% (methanolic solution); pure solid resin: viscosity (Höppler, 10% in ethyl acetate) 1.98 mPas; acid number AN (methanol) 3.37 mg KOH/g; Mw (by GPC, eluent THF; polystyrene standards): 24,300 g/mol; Mn: 9800 g/mol; polydispersity Mw/Mn: 2.48; silicon content: 0.102% (alkaline digestion).

EXAMPLE 9

A 2-liter stirred tank with reflux condenser, metering apparatus, thermostatable jacket and an anchor stirrer was initially charged with 268.78 g of ethyl acetate, 121.83 g of vinyl acetate (VAc), 1.22 g (4.15 mmol) of 3,3-diethoxypropyltriethoxysilane and 549.33 mg of PPV (t-butyl perpivalate—75% in aliphatics; half-life=1 h at 74° C.). The tank was heated to 60° C. On attainment of gentle reflux, the metering of initiator started (7.88 g of PPV and 51.49 g of ethyl acetate). During the first hour, the initiator was metered at 5 ml/h. After 1 hour of incipient polymerization, the monomer metering (616.52 g of VAc and 6.17 g (20.98 mmol) of 3,3-diethoxypropyltriethoxysilane) was subsequently started over a period of 240 minutes (rate: 167.4 ml/h). At the same time, the initiator metering was increased to 10.5 ml/h. The initiator metering ran at this rate for 300 minutes and ended 1 h after the monomer metering. After the initiator metering, the reaction ran for another 120 minutes at the reaction temperature. After this postreaction time, the tank was heated for distillation, in the course of which fresh ethyl acetate which corresponded to the amount distilled off was added to the tank every 30 minutes for 6 h (demonomerization).

Solid Resin Analyses:

Solids content (SC): 61.90% (methanolic solution); pure solid resin: viscosity (Höppler, 10% in ethyl acetate) 11.11 mPas; acid number AN (methanol) 5.61 mg KOH/g; Mw (by GPC, eluent THF; polystyrene standards): 188,600 g/mol; Mn: 43,500 g/mol; polydispersity Mw/Mn: 4.33; silicon content: 0.084% (alkaline digestion).

COMPARATIVE EXAMPLE 10

As in Example 9, with the difference that, instead of the full acetal of the silane-containing aldehyde 3,3-diethoxypropyltriethoxysilane, 4.943 g (25.19 mmol) of 3-mercaptopropyltrimethoxysilane were used. Of this, 814.57 mg (4.15 mmol) were used; 4.128 g (21.04 mmol) were in the monomer metering.

Solid Resin Analyses:

Solids content (SC): 62.02% (methanolic solution); pure solid resin: viscosity (Höppler, 10% in ethyl acetate) 4.42 mPas; acid number AN (methanol) 5.05 mg KOH/g; Mw (by GPC, eluent THF; polystyrene standards): 69,000 g/mol; Mn: 26,500 g/mol; polydispersity Mw/Mn: 2.60; silicon content: 0.076% (alkaline digestion).

The summary of the mixtures for the preparation of the silane-containing polyvinyl ester solid resins is shown by Table 1.

TABLE 1

| Ex. | Regulator type, (amount in mmol) | Transfer (%)[1] | Mw | Mn | Polydispersity | Si content (%)[2] |
|---|---|---|---|---|---|---|
| 1 | C (15.95) | 70 | 31,000 | 12,200 | 2.54 | 0.119 |
| 2 | I (15.95) | 94 | 38,000 | 14,000 | 2.71 | 0.075 |
| 3 | I (15.95) | 96 | 37,500 | 13,700 | 2.74 | 0.082 |
| C4 | SH-Silane (15.95) | 100 | 26,400 | 11,400 | 2.32 | 0.081 |
| 5 | C (11.40) | 86 | 36,500 | 15,500 | 2.35 | 0.153 |
| C6 | SH-Silane (11.41) | 100 | 32,700 | 13,500 | 2.42 | 0.113 |
| 7 | C (18.87) | 91 | 28,000 | 11,500 | 2.43 | 0.155 |
| C8 | SH-Silane (18.87) | 100 | 24,300 | 9800 | 2.48 | 0.102 |
| 9 | II (25.13) | 20 | 188,600 | 43,500 | 4.33 | 0.084 |
| C10 | SH-Silane (25.19) | 100 | 69,000 | 26,500 | 2.60 | 0.076 |

[1] The transfer of the regulator was determined with the aid of 1H NMR spectroscopy.
[2] The silicon content was determined by alkaline digestion.

Preparation of the Silane-Containing Polyvinyl Alcohols:

EXAMPLE 11

Hydrolysis of the Resin from Example 9

A 2-liter stirred tank (at ambient pressure) with reflux condenser, metering apparatus and a paddle stirrer was initially charged with 437.7 g of a 61.9% polymer solution of the silane-containing polyvinyl acetate solid resin from Example 9 in methanol which was diluted to a solids content of 20% with methanol. This solution was then heated to 55° C. Subsequently, 5.1 ml of 45% methanolic sodium hydroxide solution were added rapidly. After the gel point, the methanolic suspension was stirred at 55° C. for 2 h. In order to obtain the precipitated PVA as an aqueous solution, the suspension was heated to distillation and the distillate was replaced by water. This operation was repeated until all of the methanol had been replaced by water.

Analogously to this process, the silane-containing polyvinyl ester solid resins from Examples 1, 2, 3, 5, 7 and 9, and also from the Comparative Examples 4, 6, 8 and 10 were hydrolyzed.

The analyses of the aqueous polyvinyl alcohol solutions are listed in Table 2.

TABLE 2

| Ex. | Resin from Ex. | SC (%) | AN mg (KOH)/g | pH | HN mg (KOH)/g | Viscosity in mPas | Si content in (%)* |
|---|---|---|---|---|---|---|---|
| 11 | 9 | 16.3 | 0 | 6.6 | 10.7 | 6.33 | 0.162 |
| C12 | C10 | 16.1 | 0 | 6.8 | 10.5 | 5.28 | 0.151 |
| 13 | 1 | 17.0 | 0.1 | 7.3 | 8.3 | 2.68 | 0.238 |
| C14 | C4 | 18.1 | 0.1 | 7.1 | 6.4 | 2.26 | 0.158 |
| 15 | 5 | 14.0 | 0 | 7.2 | 7.6 | 2.73 | 0.296 |
| C16 | C6 | 12.0 | 0 | 7.0 | 8.3 | 2.57 | 0.220 |
| 17 | 7 | 14.9 | 0 | 7.8 | 8.5 | 2.37 | 0.305 |
| C18 | C8 | 14.4 | 0 | 7.0 | 10.0 | 2.21 | 0.199 |
| 19 | 2 | 15.3 | 0.1 | 7.1 | 11.2 | 2.51 | 0.149 |
| 20 | 3 | 17.2 | 0 | 7.4 | 9.4 | 2.49 | 0.158 |

*Alkaline digestion

Preparation of the Silane-Containing Polyvinyl Acetals:

EXAMPLE 21

A 6-liter glass reactor was initially charged with 1141 ml of dist. water, 526 ml of 20% HCl and 678 ml of a 16.3% aqueous solution of the polyvinyl alcohol from Example 11, viscosity 6.33 mPas (DIN 53015; Höppler method; 4% aqueous solution). The initial charge was cooled to −2° C. with stirring within one hour. 90 ml of butyraldehyde, precooled to −4° C., were now added within a period of 5 minutes. The internal reactor temperature rose to −1.0° C. which, though, could be brought back to precipitation temperature of −2° C. within a very short time. Approx. 3 minutes after the butyraldehyde had been added, the initially clear mixture became milky and opaque, and the product precipitated out only 5 minutes later. After 40 minutes of reaction time at −2° C., the temperature was increased to 25° C. over a period of 3.5 hours and this temperature was maintained for a further 2 hours. The product was then filtered and washed under flowing, distilled water for approx. 15 minutes. Subsequently, the filtercake was placed back into the glass reactor and resuspended with 4 liters of distilled water. The measured pH of the suspension was 3.1. The suspension was now made alkaline (pH 12.2) with 14 ml of 10% sodium hydroxide solution and stirred at room temperature for 15 hours. Subsequently, the suspension was heated to 50° C. and stirred for a further 4 hours. After cooling to room temperature, the product was in turn filtered and washed with distilled water until the filtrate had a neutral reaction. Subsequently, drying was effected down to a solids content of at least 98%, initially at 22° C., then at 35° C. under reduced pressure.

A silane-containing polyvinylbutyral having 16.0% by weight of vinyl alcohol units, 1.5% by weight of vinyl acetate units and 82.5% by weight of vinyl butyral units was obtained.

The viscosity of a 10% ethanolic solution to DIN 53015, Höppler method, was 143.2 mPas. Si content: 0.099% by weight (all measurements with alkaline digestion).

COMPARATIVE EXAMPLE 22

As in Example 21, but with 1600 ml of dist. water, 744 ml of 20% HCl, 127 ml of butyraldehyde and 970 ml of a 16.1% aqueous solution of the polyvinyl alcohol from Comparative Example 12, viscosity 5.28 mPas (DIN 5015; Höppler method; 4% aqueous solution). The pH after the resuspension was 3.3. The suspension was made alkaline (pH 12.3) with 20 ml of 10% sodium hydroxide solution and stirred at room temperature likewise for 15 hours and at 50° C. for 4 hours.

A modified polyvinyl butyral having 17.4% by weight of vinyl alcohol units, 1.3% by weight of vinyl acetate units and 81.3% by weight of vinyl butyral units was obtained.

The viscosity (DIN 53015; Höppler method; 10% ethanolic solution) was 97.2 mPas. Si content: 0.093% by weight. The 10% ethanolic solution was yellow.

EXAMPLE 23

A 6-liter glass reactor was initially charged with 1400 ml of dist. water, 492 ml of 20% HCl and 954 ml of a 17.0% aqueous solution of the polyvinyl alcohol from Example 13—viscosity 2.68 mPas (DIN 53015; Höppler method; 4% aqueous solution). The initial charge was cooled to 5° C. with stirring within 45 minutes. Within a period of 5 minutes, 60 ml of acetaldehyde, precooled to −4° C., were added. About 15 minutes after the acetaldehyde addition, the solution which had been clear up to that point became slightly cloudy. 20 minutes after addition of the acetaldehyde, 76 ml of butyraldehyde precooled to −4° C. were introduced within the same period. The internal reactor temperature rose to 6.8° C. It was cooled again to 5° C. within a very short time. Approximately 5 minutes after the butyraldehyde addition, the product precipitated out. After 40 minutes of reaction time at 5° C., the temperature was increased to 25° C. over a period of 3.5 hours and this temperature was maintained for a further 2 hours. The product was then filtered and washed under flowing, distilled water for approx. 15 minutes. Subsequently, the filtercake was placed back into the glass reactor and resuspended with 4 liters of distilled water. The measured pH value of the suspension showed 3.1. The suspension was now made alkaline (pH 12.2) with 18 ml of 10% sodium hydroxide solution and stirred at room temperature for approx. 15 hours. Subsequently, the suspension was heated to 40° C. and stirred for a further 4 hours. After cooling to room temperature, the product was again filtered off and washed with distilled water until the filtrate had a neutral reaction. Subsequently, drying was effected down to a solids content of at least 98%, initially at 22° C., then at 35° C. under reduced pressure.

A modified polyvinyl acetal having 15.6% by weight of vinyl alcohol units, 1.1% by weight of vinyl acetate units and 83.3% by weight of vinyl acetal units was obtained. The viscosity (DIN 53015; Höppler method; 10% ethanolic solution) was 27.8 mPas. The Si content was determined to be 0.149% by weight.

COMPARATIVE EXAMPLE 24

As in Example 23, but with 1520 ml of dist. water, 512 ml of 20% HCl, 62 ml of acetaldehyde, 79 ml of butyraldehyde and 928 ml of a 18.1% aqueous solution of the polyvinyl alcohol from Comparative Example 14, viscosity 2.26 mPas (DIN 53015; Höppler method; 4% aqueous solution). The pH after the resuspension was 3.4. The suspension was made alkaline (pH 12.4) with 19 ml of 10% sodium hydroxide solution and stirred at room temperature likewise for 15 hours and at 50° C. for 4 hours.

A modified polyvinyl acetal having 15.6% by weight of vinyl alcohol units, 1.3% by weight of vinyl acetate units and 83.1% by weight of vinyl acetal units was obtained. The viscosity (DIN 53015; Höppler method; 10% ethanolic solution) was 27.1 mPas. The Si content was determined to be 0.157% by weight. The 10% ethanolic solution was slightly yellow.

EXAMPLE 25

As in Example 21, but with 1450 ml of dist. water, 760ml of 20% HCl, 129ml of butyraldehyde and 1216 ml of a 14.0% aqueous solution of the polyvinyl alcohol from Example 15, viscosity 2.73 mPas (DIN 53015; Höppler method; 4% aqueous solution). The pH after the resuspension was 3.6. The suspension was made alkaline (pH 12.2) with 20 ml of 10% sodium hydroxide solution and stirred at room temperature likewise for 15 hours and at 40° C. for 4 hours.

A modified polyvinyl butyral having 17.2% by weight of vinyl alcohol units, 1.4% by weight of vinyl acetate units and 81.4% by weight of vinyl butyral units was obtained.

The viscosity (DIN 53015; Höppler method; 10% ethanolic solution) was 112.2 mPas. Si content: 0.193% by weight.

COMPARATIVE EXAMPLE 26

As in Example 21, but with 1280 ml of dist. water, 750 ml of 20% HCl, 128 ml of butyraldehyde and 1400 ml of a 12.0% aqueous solution of the polyvinyl alcohol from Comparative Example 16, viscosity 2.57 mPas (DIN 53015; Höppler method; 4% aqueous solution). The precipitation temperature was −4° C. The pH after the resuspension was 3.6. The suspension was made alkaline (pH 12.2) with 20 ml of 10% sodium hydroxide solution and stirred at room temperature likewise for 15 hours and at 40° C. for 4 hours.

A modified polyvinyl butyral having 17.6% by weight of vinyl alcohol units, 1.3% by weight of vinyl acetate units and 81.1% by weight of vinyl butyral units was obtained.

The viscosity (DIN 53015; Höppler method; 10% ethanolic solution) was 26.3 mPas. Si content: 0.136% by weight. The 10% ethanolic solution was intensely yellow.

EXAMPLE 27

As in Example 21, but with 1580 ml of dist. water, 780 ml of 20% HCl, 133 ml of butyraldehyde and 1170 ml of a 14.9% aqueous solution of the polyvinyl alcohol from Example 17, viscosity 2.37 mPas (DIN 53015; Höppler method; 4% aqueous solution). The precipitation temperature was −4° C. The pH after the resuspension was 3.3. The suspension was made alkaline (pH 12.2) with 21 ml of 10% sodium hydroxide solution and stirred at room temperature likewise for 15 hours and at 40° C. for 4 hours.

A modified polyvinyl butyral having 17.1% by weight of vinyl alcohol units, 1.5% by weight of vinyl acetate units and 81.4% by weight of vinyl butyral units was obtained.

The viscosity (DIN 53015; Höppler method; 10% ethanolic solution) was 23.4 mPas. Si content: 0.189% by weight.

COMPARATIVE EXAMPLE 28

As in Example 21, but with 1500 ml of dist. water, 750 ml of 20% 1HCl, 128 ml of butyraldehyde and 1170 ml of a 14.4% aqueous solution of the polyvinyl alcohol from Comparative Example 18, viscosity 2.21 mPas (DIN 53015; Höppler method; 4% aqueous solution). The precipitation temperature was −5° C. The pH after the resuspension was 3.6. The suspension was made alkaline (pH 12.2) with 20 ml of 10% sodium hydroxide solution and stirred at room temperature likewise for 15 hours and at 35° C. for 4 hours.

A modified polyvinyl butyral having 17.5% by weight of vinyl alcohol units, 1.5% by weight of vinyl acetate units and 81.0% by weight of vinyl butyral units was obtained.

The viscosity (DIN 53015; Höppler method; 10% ethanolic solution) was 20.6 mPas. Si content: 0.122% by weight. The 10% ethanolic solution was yellow.

EXAMPLE 29

As in Example 21, but with 1600 ml of dist. water, 770 ml of 20% HCl, 125 ml of butyraldehyde and 1140 ml of a 15.3% aqueous solution of the polyvinyl alcohol from Example 19, viscosity 2.51 mPas (DIN 53015; Höppler method; 4% aqueous solution). The precipitation temperature was −4° C. The pH after the resuspension was 3.3. The suspension was made alkaline (pH 12.3) with 21 ml of 10% sodium hydroxide solution and stirred at room temperature likewise for 15 hours and at 40° C. for 4 hours.

A modified polyvinyl butyral having 18.2% by weight of vinyl alcohol units, 1.4% by weight of vinyl acetate units and 80.4% by weight of vinyl butyral units was obtained.

The viscosity (DIN 53015; Höppler method; 10% ethanolic solution) was 25.9 mPas. Si content: 0.094% by weight.

EXAMPLE 30

As in Example 21, but with 1700 ml of dist. water, 800 ml of 20% HCl, 120 ml of butyraldehyde and 990 ml of a 17.2% aqueous solution of the polyvinyl alcohol from Example 20, viscosity 2.49 mPas (DIN 53015; Höppler method; 4% aqueous solution). The precipitation temperature was −4° C. The pH after the resuspension was 3.3. The suspension was made alkaline (pH 12.4) with 22 ml of 10% sodium hydroxide solution and stirred at room temperature likewise for 15 hours and at 40° C. for 4 hours.

A modified polyvinyl butyral having 18.6% by weight of vinyl alcohol units, 1.3% by weight of vinyl acetate units and 80.1% by weight of vinyl butyral units was obtained.

The viscosity (DIN 53015; Höppler method; 10% ethanolic solution) was 25.1 mPas. Si content: 0.101% by weight.

Determination Methods:

1. Determination of the Dynamic Viscosity of a Solution of Polyvinyl Acetal (Solution Viscosity):

90.00±0.01 g of ethanol and 10.00±0.01 g of polyvinyl acetal were weighed in a 250 ml Erlenmeyer flask with ground-glass stopper and fully dissolved at 50° C. in the agitation machine. Subsequently, the solution was cooled to 20° C. and the dynamic viscosity (DIN 53015; Höppler method) was determined at 20° C. with a suitable sphere, for example sphere 3.

2. Determination of the Vinyl Alcohol Content:

The content of vinyl alcohol groups in the polyvinyl acetals was determined by the acetylation of the hydroxyl groups with acetic anhydride in the presence of pyridine and 4-dimethylaminopyridine.

To this end, 1 g±0.001 g of polyvinyl acetal was dissolved in 24 ml of pyridine and 0.04 g of 4-dimethylaminopyridine at 50° C. within 2 hours. The solution, cooled to 25° C., was admixed with 10 ml of a mixture of pyridine and acetic anhydride (87/13 parts by volume) and mixed intensively for 1 hour. 30 ml of a mixture of pyridine/water (5/1 parts by volume) was then added and the mixture was agitated for a further hour. Subsequently, titration was effected to pH 7 with methanolic 0.5 N KOH.

Calculation:

% by weight of vinyl alcohol=$[(100 \times M_w)/2000] \times$(blank value in ml−sample ml). Mw=average molecular weight per repeat unit of the polymer.

3. Determination of the Viscosity of the Polyvinyl Alcohol Solutions:

The viscosity of the partly or fully hydrolyzed silanized polyvinyl ester solid resins used as starting materials was determined analogously to the determination of the dynamic viscosity of the polyvinyl acetals; only 4% aqueous solutions were used.

What is claimed is:

1. A process for preparing silane-containing polyvinyl alcohols and polyvinyl acetals by:

a) free-radically polymerizing one or more vinyl esters of unbranched or branched alkylcarboxylic acids having from 1 to 18 carbon atoms in the presence of silane-containing aldehydes or hemiacetals or full acetals thereof to produce a vinyl ester polymer, b) hydrolyzing the vinyl ester polymers to form a partly hydrolyzed or fully hydrolyzed vinyl ester polymer, and c) optionally acetalizing of the partly hydrolyzed or fully hydrolyzed vinyl ester polymer.

2. The process of claim 1, wherein free-radically polymerizing is carried out by means of bulk polymerization, suspension polymerization or by polymerization in organic solvents.

3. The process of claim 1, wherein hydrolyzing of the vinyl ester polymers takes place in alkaline or acidic media.

4. The process of claim 1, wherein acetalizing is effected by reacting the partly or fully hydrolyzed vinyl ester polymer with aliphatic or aromatic aldehydes having from 1 to 15 carbon atoms optionally substituted by one or more substituents selected from the group consisting of hydroxyl, carboxyl, sulfonate, ammonium, and aldehyde radicals.

5. The process of claim 1, wherein further silane-containing compounds or aldehyde-containing compounds or mixtures thereof are additionally used as regulators in the polymerization.

6. The process of claim 1, wherein the silane-containing aldehydes and hemiacetals and full acetals thereof are selected from the group consisting of compounds of the structural formulae I) $R_3Si-[OSiR_2]_y-(CH_2)_x-CH=O$, II) $R_3Si-[OSiR_2]_y-(CH_2)_x-CH(OR^1)_2$, III) $R_3Si-[OSiR_2]_y-(CH_2)_z-Ar-(CH_2)_z-CH=O$, IV) $R_3Si-[OSiR_2]_y-(CH_2)_z-Ar-(CH_2)_z-CH(OR^1)_2$, V) $O=CH-(CH_2)_x-Si(R)_2-O-Si(R)_2-(CH_2)_x-CH=O$, VI) $[SiO(R)-(CH_2)_z-CH=O]_{3-4}$, where R individually is halogen; is an unbranched or branched, saturated or unsaturated, optionally substituted alkyl or alkoxy radical having from 1 to 12 carbon atoms; is an acyl radical having from 2 to 12 carbon atoms, where R may optionally be interrupted by one or more non-adjacent heteroatoms selected from the group consisting of N, O, S; is an optionally substituted aryl or aryloxy radical having 3 to 20 carbon atoms, where the aryl radical may also contain one or more heteroatoms selected from the group consisting of N, O, S, and $R^1$ individually is H, an unbranched or branched, saturated or unsaturated, optionally substituted alkyl radical having from 1 to 12 carbon atoms which may optionally be interrupted by non-adjacent heteroatoms selected from the group consisting of N, O, S; Ar is an aromatic group which may optionally contain one or more heteroatoms selected from the group consisting of N, O, S, and x is from 2 to 40, y is from 0 to 100, and z is from 0 to 20.

7. The process of claim 1, wherein the silane-containing aldehydes are used in an amount of from 0.0001 to 5.0% by weight, based on the total weight of the monomers.

8. The process of claim 1, wherein ethylenically unsaturated, silane-containing monomers are copolymerized.

* * * * *